United States Patent Office 2,848,925
Patented Aug. 26, 1958

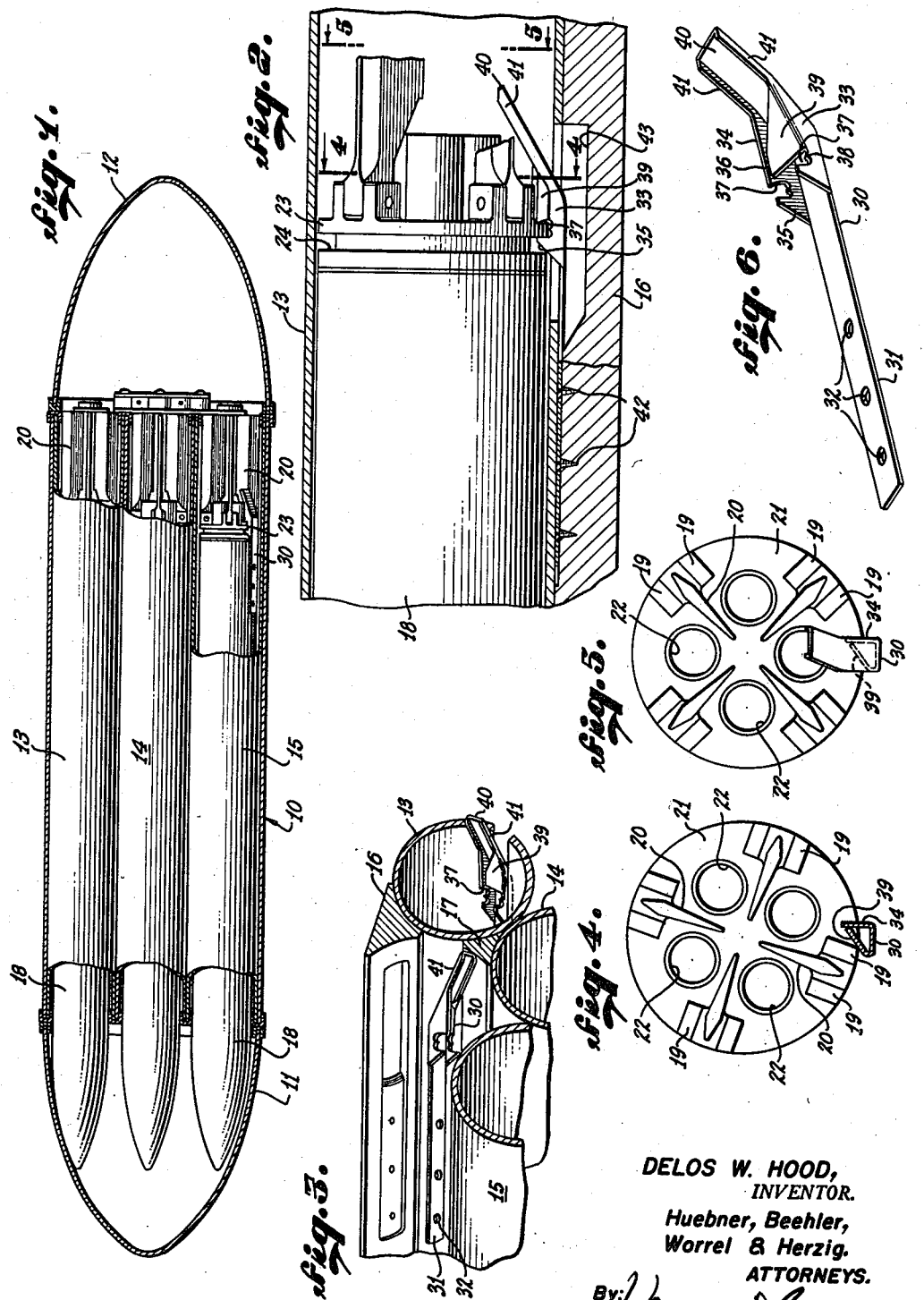

2,848,925

BLAST RELEASE DETENT

Delos W. Hood, Sherman Oaks, Calif., assignor, by mesne assignments, to the United States of America as represented by the Secretary of the Navy Application May 31, 1955, Serial No. 512,191

3 Claims. (Cl. 89—1.7)

The invention relates to rocket launchers and has particular reference to a detent or clip by means of which rockets are retained in tubes in a launcher until the rocket is ready to be fired or until for some reason it be advisable to unload the unfired rockets. The invention is an improvement over certain forms of copending application Serial No. 423,618, filed April 16, 1954.

With the advent of rockets adapted to be carried and fired from airplanes has come the development of a variety of different kinds of rocket launchers. The most general characteristic of such launchers is that of a casing so constructed that it is capable of containing a number of rockets in parallel grouping, the casing as a rule containing certain mechanism adapted to the firing of the rockets in a predetermined and desired order. Launchers of this kind have necessitated provision of clips whereby rockets could be held safely and securely in the launcher until the time arrives for their release. Inasmuch as rockets carry explosive charges, considerable care has been exercised in anchoring in effect the rockets in the launchers so that they cannot become inadvertently loosened until a proper time but the same care is also needed to provide a mechanism acting with a satisfactory degree of certainty to positively release the rocket when the time comes for firing. Because of these demands somewhat complex detents have been resorted to which by reason of their lack of simplicity have defeated some of the primary airms in that they are not sure of release under all circumstances and furthermore are such that rockets once loaded can be unloaded only with difficulty. Rockets carried by permanent or non-disposable launchers have been those chiefly equipped with detents having the undesirable characteristics.

It is therefore among the objects of the invention to provide a new and improved detent for rocket launchers which is positive in its action both with respect to holding rockets in place in the tubes provided for them until the time comes for launching and also being positive acting when the rocket is to be released.

Another object of the invention is to provide a new and improved detent for rockets held in tubes in a rocket launcher which is sufficiently sensitive to release at the time of firing to make certain that a rocket will be released from the tube once it has been fired.

Still another object of the invention is to provide a new and improved releasable detent for holding rockets in tubes in a launcher which permits the rockets to be easily loaded and engaged with the detent and which is especially adapted for front loading, the detent furthermore being so constructed that the rocket can be easily unloaded by hand when the launcher needs to be disarmed without requiring acess to the detent.

Still another object of the invention is to provide a new and improved rocket launcher detent which while providing a positive grip on the rocket for transportation purposes and a positive release for the rocket upon the rocket being fired is moreover so designed that as the rocket leaves the launching tube there will be no inadvertent scoring of the exterior surface of the rocket whether the rocket leaves upon being fired or whether it is removed by hand.

Also among the objects of the invention is to provide a new and improved detent clip for rocket launchers which is simple and inexpensive in construction and which is so designed that it can be easily mounted in a tube occupying a relatively minimum amount of space and which needs no special construction of the tube to be operable, the clips being such that they are well adapted to use in launchers having a multiple number of tubes.

Further included among the objects of the invention is to provide a new and improved detent clip for rocket launchers which can be passed by a rocket whether during loading or during the firing of a second rocket in line, the clip being of such design and construction that it will hold the rocket until either released by a blast or by reason of the fact that there is sufficient thrust in a rocket to overcome the detent.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view partially broken away illustrating a launcher provided with a plurality of tubes with rockets in place therein and showing the location of the releasable detent.

Figure 2 is an enlarged longitudinal sectional view of one of the tubes showing the location and arrangement of the detent in engagement with a rocket.

Figure 3 is a fragmentary aft end perspective view broken away to a degree in order to show the location of the clip in a tube.

Figure 4 is a cross-sectional view taken on the line 4—4 of Figure 2 showing engagement of the rocket with the detent immediately prior to rotation for manual release.

Figure 5 is a cross-sectional view taken on the line 5—5 of Figure 2.

Figure 6 is a longitudinal perspective view of the detent clip.

In an embodiment chosen to illustrate the invention there is shown a rocket launcher for a plurality of rockets comprising a housing 10 having a forward fairing 11 and an aft fairing 12. The housing may be of light-weight construction with fairings of frangible material adapted to be ruptured when the rockets are fired. In the housing is a series of rocket holding tubes 13, 14, 15, etc., of some light-weight material, anchored in suitable position by spacer blocks 16 and 17, details of which are disclosed in connection with copending application Serial No. 423,618, filed April 16, 1954.

Rockets 18 are identical in shape and form and are provided with tail fin brackets 19 arranged in pairs with a tail fin 20 pivotally mounted between each pair of brackets. In the specific embodiment shown four tail fins are provided equally spaced about the circumference of an aft end 21 of the rocket, rocket exhaust tubes 22 being located between adjacent tail fins.

Also on the aft end of the rocket is a retaining flange 23. Between the retaining flange and the main body of the rocket is an annular groove 24.

The detent comprises chiefly a strip 30 of resilient or spring metal having an anchoring end 31 provided with screw holes. In the embodiment selected the anchoring end 31 is what may be designated as the forward end of the clip. At the aft end of the strip is a pair of flanges 33, 34, these flanges being located one on each side of the strip. Each flange has a forwardly obliquely extending loading cam 35, there being provided on a top edge 36 a notch 37. The notch 37 is of special construction in that each notch is provided with an inwardly extending point 38. One of the flanges 33 has extending along its upper edge an extension directed obliquely inwardly and providing an unloading cam 39. At the aft-most end of the strip is a blast operated member 40 extending radially inwardly toward the axis of the tube with respect to the main portion of the strip 30. Flanges 41 at the sides of the member render the member firmer when subjected to an operating blast.

It will be noted that the space block 16 to which the strip is anchored by means of screws 42 is provided with a recess 43 directly beneath the wings 33, as illustrated in Figure 2. It will be clear that the recess 43 is adapted to receive the aft end of the strip which is of resilient or springy material when the aft end is sprung outwardly relative to the axis of the tube. One clip is provided for each tube.

When rockets 18 are to be loaded into the tubes, the tail fins are folded and the rockets loaded backwards into the tubes from the fore ends. The rocket is moved rearwardly into the tube until the rear side of the retaining flange 23 strikes the loading cam 35, thereby tending to deflect the aft end of the strip outwardly into the recess 43 a distance sufficient to permit the retaining flange to pass over the loading cam whereupon the spring tension in the strip flips the aft end of the strip inwardly toward the axis of the tube and the rocket to engage the retaining flange in the notch 37. It will be noted also that the point 38 at the bottom of the notch will tend to strike into the exterior surface of the retaining flange, thereby to insure a firm and positive electric contact.

Should it be desired to unload the rockets without their being fired, it is necessary only to rotate the rocket 18 in a direction counterclockwise as viewed in Figure 4 whereupon one of the tail fin brackets striking the unloading cam 39 deflects the aft end of the strip a distance sufficient to release the retaining flange 23 from engagement in the notch 37 whereupon the rocket can be pulled forward out of the tube.

In the event the rocket is to be fired after being positioned and engaged by the detent, the rocket is fired by some conventional means. Upon firing the exhaust tubes permit passage outwardly of expanding hot gases within the rocket at a very substantial rate of flow. When the exhausting gases strike the member 40, they strike with sufficient force to cause the aft end of the detent to be tilted outwardly falling into the recess 43. The tilt will be sufficiently far to relieve the engagement of the walls of the notches 37 with the retaining flange, at which point the rocket will be driven forward by its force and thereby fired from the tube.

The strip being very small can be easily mounted between the exterior of each of the tubes 13 and the adjacent spacer block 16. It does not matter on which side the detent clip might be located, the paddle being tilted in such direction and at such angle that it will always fall within the exhaust stream from one of the exhaust tubes 22. The notch moreover is made deep enough and spring tension of the clip made strong enough to securely hold the tube in place during shipment of rockets in the launcher, during maneuvering of the airplane, and at all times except when either the rocket is to be fired or the rocket is to be removed manually.

It will be noted further that the recess 43 has substantial depth and that because of the depth the detent can be depressed well into the recess to permit a second rocket to pass the detent, with the same facility that the initial rocket can be loaded and secured by the detent. When a rocket launching tube is made double the length sufficient to hold two rockets in alignment, the detent is of such construction that a second rocket can depress the detent and be fired through the same tube as the first rocket.

The detent moreover is of such construction that in the event the member 40 might be broken off or in the event it might not receive sufficient pressure of exhausting gases, the portion of the detent which holds the retaining flange 23 of the rocket is so constructed that it will give way and permit the rocket to be released in any event.

There has accordingly been described herein a rocket launcher retaining clip which is, in being constructed of a single strip of spring-like metal, reduced substantially to elementary principles with the structure so arranged that a positive grip is had upon the rocket except on those occasions where the rocket is to be removed from the tube in the launcher either for firing or by hand.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a rocket launcher comprising a casing and a tube in the casing adapted to contain a rocket having tail elements and a retaining flange at the aft end, the combination of a rocket detent for the tube comprising a strip of spring material secured to the aft end of the tube at a location outside the inner surface of the tube with the aft end of the strip spring biased inwardly, a flange at the aft end of the strip extending generally inwardly toward the axis of the tube to a location inwardly of said inner surface and having an obliquely forwardly and outwardly extending loading cam, said flange having a notch at the innermost edge for receiving a rocket retaining flange, an extension on the strip aft of the notch extending in a lateral oblique direction and forming a tail element engaging unloading cam subject to depression by manual rotation of the rocket and a tail element thereon, said strip having a member extending obliquely inwardly and rearwardly to a location adapted to receive blast from an ignited rocket whereby to release the detent from rocket retaining flange engaging position.

2. A detent device for use with a rocket launcher comprising a casing and a plurality of tubes in the casing each adapted to contain a rocket having tail elements and a retaining flange at the aft end, said detent device comprising a strip of spring material secured to the aft end of the tube at a location outside the inner surface of the tube with the aft end of the strip spring biased inwardly, flanges at the aft end of the strip, each flange extending inwardly toward the axis of the tube to a location inwardly of said inner surface, said flanges being positioned one on each side of the strip and having a rocket retaining flange receiving notch at the innermost edge, an extension on one of said flanges having a laterally oblique extension aft of the notch forming a tail element engaging unloading cam, said strip having a member extending obliquely inwardly and rearwardly to a location adapted to receive blast from an ignited rocket whereby to release the detent from rocket retaining flange engaging position.

3. A detent device adapted for use with a rocket launcher comprising a casing, a plurality of parallel tubes in the casing each adapted to contain a rocket having tail elements and a retaining flange at the aft end, and blocks between said tubes for spacing the tubes in the casing, said detent device comprising a strip of resilient spring metal secured to one of the blocks and adjacent the aft end of the tube at a location outside the inner surface of the tube with the aft end of the strip spring biased inwardly, flanges at the aft end of the strip, each flange extending generally inwardly toward the axis of the tube to a location inwardly of said inner surface and having an obliquely forwardly and outwardly extending loading cam, said flanges being positioned one on each side of the strip and having a flange-receiving notch at the innermost edge, one of said flanges having an extension aft of the notch extending in a laterally inward oblique direction forming a tail element engaging unloading cam, said strip having a member extending obliquely inwardly and rearwardly to a location adapted to receive a blast from an ignited rocket whereby to release the detent from rocket retaining flange engaging position, said notches having inwardly extending points at the bottoms thereof adapted to make electric contact with the rocket.

References Cited in the file of this patent

UNITED STATES PATENTS

| | | |
|---|---|---|
| 2,440,723 | MacDonald | May 4, 1948 |
| 2,448,962 | D'Ardenne | Sept. 7, 1948 |
| 2,451,522 | Uhl et al. | Oct. 18, 1948 |
| 2,460,929 | Goff | Feb. 8, 1949 |